United States Patent
Yin et al.

(10) Patent No.: US 12,116,783 B2
(45) Date of Patent: Oct. 15, 2024

(54) DURABLE ROOF STRUCTURE WITH FROST RESISTANCE AND HIGH DUCTILITY AND A CONSTRUCTION METHOD THEREOF

(71) Applicant: Inner Mongolia University of Technology, Inner Mongolia Autonomous Region (CN)

(72) Inventors: Liqiang Yin, Inner Mongolia Autonomous Region (CN); Hongyuan Bian, Inner Mongolia Autonomous Region (CN); Shuguang Liu, Inner Mongolia Autonomous Region (CN); Changwang Yan, Inner Mongolia Autonomous Region (CN); Ju Zhang, Inner Mongolia Autonomous Region (CN); Xiaoxiao Wang, Inner Mongolia Autonomous Region (CN)

( * ) Notice: Subject to any disclaimer, the term of this patent is extended or adjusted under 35 U.S.C. 154(b) by 221 days.

(21) Appl. No.: 17/828,762

(22) Filed: May 31, 2022

(65) Prior Publication Data
US 2023/0175263 A1 Jun. 8, 2023

(30) Foreign Application Priority Data
Dec. 6, 2021 (CN) .......................... 202111481926.3

(51) Int. Cl.
*E04D 3/35* (2006.01)
*E04D 11/02* (2006.01)
(52) U.S. Cl.
CPC .............. *E04D 3/352* (2013.01); *E04D 11/02* (2013.01); *B32B 2419/06* (2013.01)

(58) Field of Classification Search
CPC ........................... E04D 3/352; B32B 2419/06
See application file for complete search history.

(56) References Cited

U.S. PATENT DOCUMENTS

| | | | | |
|---|---|---|---|---|
| 3,411,256 A | * | 11/1968 | Best .................. | E04D 13/16 52/515 |
| 2013/0284070 A1 | * | 10/2013 | Dubey .................. | C04B 11/28 106/695 |
| 2014/0037855 A1 | * | 2/2014 | Otero Martinez ... | C08G 18/632 524/507 |
| 2020/0317572 A1 | * | 10/2020 | Arce .................. | C04B 28/021 |
| 2021/0317294 A1 | * | 10/2021 | Di Mondo .............. | C08J 11/04 |

FOREIGN PATENT DOCUMENTS

CN 113336516 A * 9/2021

OTHER PUBLICATIONS

CN113336516A_English translation (Year: 2021).*

* cited by examiner

*Primary Examiner* — Jasper Saberi

(57) ABSTRACT

The invention discloses a durable roof structure with frost resistance and high ductility and a construction method thereof, belonging to the technical field of roofing, and comprises a base layer, a leveling layer, a flexible waterproof coating, a thermal insulation layer and a crack-resistant and frost-resistant surface layer arranged in sequence from bottom to top. The invention not only has lower requirements on construction conditions and simple operation, but also reduces the generation of large cracks, effectively improves the crack resistance and frost resistance of the roof, improves the roof structure, and is more suitable for the northern cold region.

6 Claims, 1 Drawing Sheet

DURABLE ROOF STRUCTURE WITH FROST RESISTANCE AND HIGH DUCTILITY AND A CONSTRUCTION METHOD THEREOF

1. TECHNICAL FIELD

The invention relates to the technical field of roofing, in particular to a durable roof structure with frost resistance and high ductility and a construction method thereof.

2. BACKGROUND ART

The roof is the topmost surface of a building, which is used to enclose and protect the interior space, prevent rainwater, block the scorching sun, and also withstand snow loads. At present, the roof structure is becoming more and more important, but some roof structures are more complex and the selected materials are relatively simple, so it is difficult for the roof structure to achieve the ideal effect of crack resistance and frost resistance.

In the cold northern regions, the external environment experienced by the roof structure is even harsher. For example, in a low temperature environment, the free water in the internal pores of the roof structure freezes, expands in volume and generates tension, after multiple freeze-thaw cycles, the roof structure will crack or even fail in performance. When rainwater invades, it is easy to cause water seepage on the roof, which seriously affects people's daily life.

At present, the commonly used roof structures mostly include a drainage structure, this drainage structure is mostly composed of a water guide block, a water storage cavity and a water storage tank, although it has the effect of waterproofing and thermal insulation, it has complex operation, many processes, high requirements for construction conditions and weak practicability.

The traditional roof structure generally adopts the upright roof structure and the inverted roof structure. The upright roof structure from bottom to top is the base layer, the thermal insulation layer, the leveling layer, the waterproof layer, and the protective layer. The upright roof structure has low requirements for thermal insulation materials and low cost, but the construction is complicated and the service life is short. The inverted roof structure from bottom to top is the base layer, the leveling layer, the waterproof layer, the thermal insulation layer and the protective layer. The inverted roof structure has a simple structure and is easy to construct, but it has higher requirements for thermal insulation materials and higher construction costs. The above two roof structures use the combination of waterproof layer and thermal insulation layer to achieve the effect of waterproof and thermal insulation, however, under the influence of the external environment, the protective layers of these two roof structures are prone to cracks and losing the function of protecting the waterproof layer and the thermal insulation layer, resulting in roof cracking and water seepage.

In addition to the roof structure, the performance of the currently selected building materials for the roof structure cannot fully achieve the ideal crack resistance and frost resistance. For example, fine aggregate concrete and other materials are used for the protective layer of ordinary roof structures, but the fine aggregate concrete has low ductility, is easy to damage and causes cracks, and will infiltrate when rainwater is attacked, and the commonly used leveling layer materials are mostly 1:3 cement mortar leveling, but the consistency is poor, the cost is high, and the energy consumption is high.

3. SUMMARY OF THE INVENTION

In order to solve the above problems, the invention adopts the following technical schemes:

a durable roof structure with frost resistance and high ductility comprises a base layer, a leveling layer, a flexible waterproof coating, a thermal insulation layer and a crack-resistant and frost-resistant surface layer arranged in sequence from bottom to top.

Further, the leveling layer is made of multi-component solid waste cementitious material, the multi-component solid waste cementitious material is prepared from industrial solid wastes.

Further, the thickness of the leveling layer is 15-30 mm.

Further, the flexible waterproof coating is sprayed with High-intensity Elastomeric Polyurea Waterproofing Coating.

Further, the thermal insulation layer is made of graphite modified extruded polystyrene foam board.

Further, the thickness of the thermal insulation layer is not less than 25 mm.

Further, the crack-resistant and frost-resistant surface layer is made of Polyvinyl Alcohol Fiber-Engineered Cementitious Composites.

The construction method of the durable roof structure with frost resistance and high ductility according to any one of the above, comprising:

S10. Using 1:3 cement mortar for the roof board to be leveled and smoothed to form the base layer;

S20. Cleaning the surface protrusions of the base layer, laying 1:3 multi-component solid waste cementitious material mortar on the upper part of the base layer for leveling, and reserving a certain width of separation seams to form a leveling layer;

S30. Cleaning the particles and floating dust on the surface of the leveling layer to ensure the tightness of the joints; using a spray gun to shoot the leveling layer horizontally or lifting the spray gun slightly upwards, so that the sprayed High-intensity Elastomeric Polyurea Waterproofing Coating is evenly dispersed in the air to form a flexible waterproof coating on the surface of the leveling layer;

S40. Cleaning the surface of the flexible waterproof coating to ensure that the surface of the flexible waterproof coating is dry and smooth, and has no bulging and cracking phenomenon; laying a certain thickness of graphite modified extruded polystyrene foam board to form a thermal insulation layer;

S50. Cleaning the surface of the thermal insulation layer; fully covering the surface of the thermal insulation layer with Polyvinyl Alcohol Fiber-Engineered Cementitious Composites, taping and leveling to form a crack-resistant and frost-resistant surface layer.

Further, in step S20, the width of the separation seam is 5-20 mm, and the maximum distance between the separation seams is 6 m.

Further, in step S40, the thickness of the graphite modified extruded polystyrene foam board is 60 mm.

Advantageous Effects a durable roof structure with frost resistance and high ductility provided by the invention not only has lower requirements on construction conditions and simple operation, but also is more suitable for the northern cold region.

PVA (Polyvinyl Alcohol) Fiber-Engineered Cementitious Composites have ultra-high toughness and frost resistance, and can withstand multiple freeze-thaw cycles without damage. Therefore, the use of PVA (Polyvinyl Alcohol) Fiber-Engineered Cementitious Composites in the outermost layer of the roof structure (crack-resistant and frost-resistant surface layer) in the northern low temperature environment can effectively reduce the generation of large cracks, and achieve the objects of controlling cracks and preventing water seepage.

Graphite modified extruded polystyrene foam board is an organic polymer thermal insulation material, it has low water absorption and thermal conductivity and good compressive strength, which can not only reduce the thermal conductivity of the roof and improve the thermal insulation effect, but also can reduce the thermal conductivity of the roof. It can reduce the water absorption rate of the roof and prevent the phenomenon of water seepage and loss of thermal insulation effect between roof structures due to external rainwater invasion. Compared with other thermal insulation materials, it has certain advantages.

High-intensity Elastomeric Polyurea Waterproofing Coating has strong waterproofness and adhesion, and is an environmentally friendly waterproof coating. High-intensity Elastomeric Polyurea Waterproofing Coating can be sprayed on the leveling layer and the thermal insulation layer, which not only reduces the construction process, improves the construction efficiency, but also ensures excellent waterproof and thermal insulation effect.

The multi-component solid waste cementitious material is a building material composed of industrial solid wastes such as zirconium slag, coal gangue and carbide slag, which can perfectly replace cement materials, it not only has low cost and low energy consumption, but also realizes the utilization of solid wastes. Using this as a building material not only reduces environmental pollution, but also promotes the green development of China's construction industry.

In conclusion, the durable roof structure with frost resistance and high ductility provided by the invention reduces the generation of large cracks, effectively improves the crack resistance and frost resistance of the roof, improves the roof structure.

4. BRIEF DESCRIPTION OF ACCOMPANY DRAWINGS

As shown in the accompanying drawings: 1 base layer, 2 leveling layer, 3 flexible waterproof coating, 4 thermal insulation layer, 5 crack-resistant and frost-resistant surface layer.

5. SPECIFIC EMBODIMENT OF THE INVENTION

Embodiment 1

The durable roof structure with frost resistance and high ductility provided by the invention not only has simple construction and low cost, but also has a long service life and good crack resistance and frost resistance, and is suitable for the northern cold region.

Figure 1:
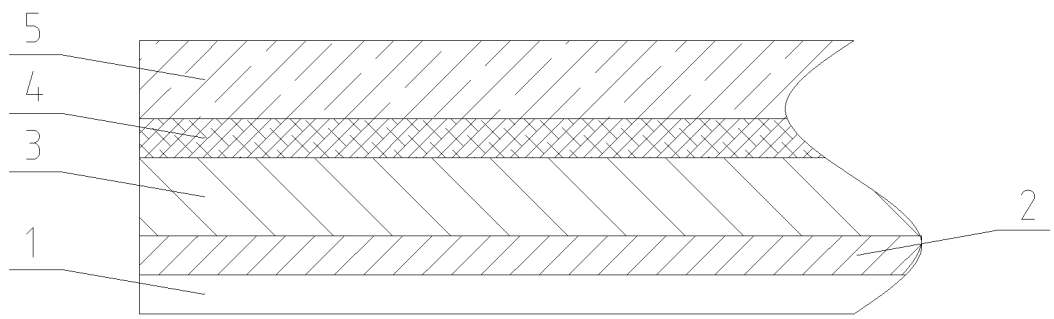
FIG. 1 is a schematic diagram of a durable roof structure with frost resistance and high ductility of the invention.
Figure 2:
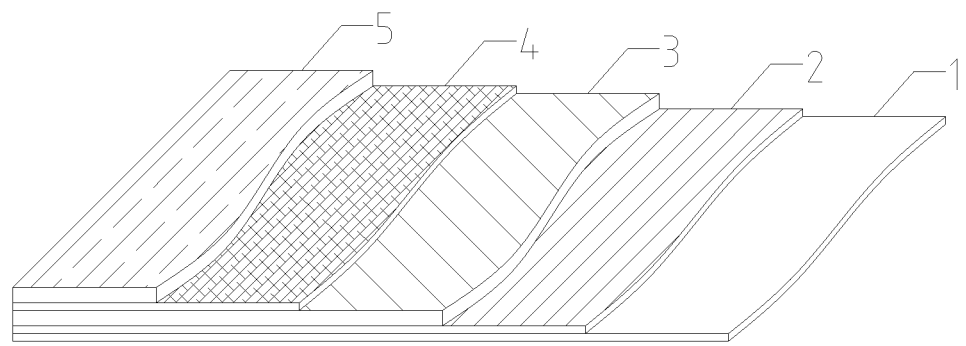
FIG. 2 is a sectional view of a durable roof structure with frost resistance and high ductility of the invention.

Referring to FIGS. 1-2, a durable roof structure with frost resistance and high ductility includes a base layer 1, a leveling layer 2, a flexible waterproof coating 3, a thermal insulation layer 4 and a crack-resistant and frost-resistant surface layer 5 arranged in sequence from bottom to top.

In this embodiment, the leveling layer 2 is made of multi-component solid waste cementitious material, the multi-component solid waste cementitious material is prepared from industrial solid wastes, the multi-component solid waste cementitious material is an excellent building material prepared by making full use of solid wastes, which realizes the utilization of solid wastes and saves cost. The thickness of the leveling layer 2 is 15-30 mm, preferably 20 mm.

Wherein, the multi-component solid waste cementitious material is a building material composed of industrial solid wastes such as zirconium slag, coal gangue and carbide slag, which can perfectly replace cement materials, it not only has low cost and low energy consumption, but also realizes the utilization of solid wastes. Using this as a building material not only reduces environmental pollution, but also promotes the green development of China's construction industry.

In this embodiment, the specific method of leveling layer 2 is that using 1:3 multi-component solid waste cementitious material mortar for leveling, with a thickness of 20 mm.

In this embodiment, the flexible waterproof coating 3 is made of High-intensity Elastomeric Polyurea Waterproofing Coating by spraying. According to "Technical Code for Roof Engineering" GB 50345, when the waterproof level is Class I, the minimum thickness of the synthetic polymer waterproof coating is 1.5 mm, when the waterproof level is Class II, the minimum thickness of the synthetic polymer waterproof coating is 2.0 mm. Since the flexible waterproof coating adopts High-intensity Elastomeric Polyurea Waterproofing Coating, in this embodiment, the thickness of the flexible waterproof coating 3 is not less than 1.5 mm, preferably 1.5 mm.

Wherein, High-intensity Elastomeric Polyurea Waterproofing Coating has strong waterproofness and adhesion, and is a new type of green material, compared with the commonly used waterproof materials, High-intensity Elastomeric Polyurea Waterproofing Coating can be quickly cured in a short time, it is not susceptible to changes in ambient temperature and humidity, and has high tensile strength, good flexibility and durability.

In this embodiment, High-intensity Elastomeric Polyurea Waterproofing Coating is sprayed on the leveling layer 2 and thermal insulation layer 4, which not only reduces the construction process, improves the construction efficiency, but also ensures excellent waterproof and thermal insulation effect.

In this embodiment, the specific method of the flexible waterproof coating 3 is spraying High-intensity Elastomeric Polyurea Waterproofing Coating on the surface of the leveling layer 2, and using its fast curing performance for waterproof treatment.

In this embodiment, the thermal insulation layer 4 is made of graphite modified extruded polystyrene foam board, and the thickness of the thermal insulation layer 4 is not less than 25 mm, preferably 60 mm.

Wherein, the extruded polystyrene foam board itself has low water absorption and thermal conductivity, after adding graphite, the thermal conductivity of the material decreases more significantly, and it has lower water absorption and thermal conductivity and better compressive strength, the thermal insulation is stronger, and the thickness of the protective layer can be reduced under the same thermal insulation conditions.

The application of graphite modified extruded polystyrene foam board to the thermal insulation layer 4 of the roof can not only reduce the thermal conductivity of the roof and improve the thermal insulation effect, but also reduce the water absorption rate of the roof and prevent water seepage and loss of thermal insulation effect between roof structures due to the invasion of external rain, compared with other thermal insulation materials, it has certain advantages and is more suitable for buildings in northern regions.

In this embodiment, the specific method of insulation layer 4 is 60 mm graphite modified extruded polystyrene foam board.

In this embodiment, the crack-resistant and frost-resistant surface layer 5 is made of PVA (Polyvinyl Alcohol) Fiber-Engineered Cementitious Composites. The PVA Fiber-Engineered Cementitious Composites are used for the crack-resistant and frost-resistant surface layer, the thickness should not be less than 30 mm, the surface is smoothed and calendered, and separation seams are set. The width of the separation seam should be 10 mm-20 mm, the vertical and horizontal spacing should not be greater than 6 m, and the sealing material should be filled, wherein the width of the separation seam is preferably 20 mm.

Wherein, PVA (Polyvinyl Alcohol) Fiber is hydrophilic, non-toxic, environmentally friendly, and low-cost, ECC (Engineered Cementitious Composites) have ultra-high toughness and are not easy to crack. Compared with other roofing materials, PVA (Polyvinyl Alcohol) Fiber-Engineered Cementitious Composites have higher ductility, non-toxicity, environmental protection and frost resistance, and can withstand multiple freeze-thaw cycles without damage.

Therefore, the use of PVA (Polyvinyl Alcohol) Fiber-Engineered Cementitious Composites in the outermost layer of the roof structure (crack-resistant and frost-resistant surface layer) in the northern low temperature environment can effectively reduce the generation of large cracks, and achieve the objects of controlling cracks and preventing water seepage.

In this embodiment, the specific method of the crack-resistant and frost-resistant surface layer 5 is fully laying PVA (Polyvinyl Alcohol) Fiber-Engineered Cementitious Composites, patting and leveling, and the thickness meets the use requirements.

The durable roof structure with frost resistance and high ductility provided by this embodiment applies PVA Fiber-Engineered Cementitious Composites, graphite modified extruded polystyrene foam board, High-intensity Elastomeric Polyurea Waterproofing Coating, multi-component solid waste cementitious material to different structural layers, which can give full play to the various characteristics of the above materials, so as to achieve the object of improving the crack resistance and frost resistance of the roof.

The durable roof structure with frost resistance and high ductility provided by this embodiment not only has a special structure, novel material selection, good crack resistance, strong frost resistance, and long service life, but also can meet the requirements of waterproofing while achieving thermal insulation and energy saving, environmental protection, and enhances the practicability of the entire roof structure.

In conclusion, the durable roof structure with frost resistance and high ductility provided by the invention can reduce the generation of large cracks, effectively improve the crack resistance and frost resistance of the roof, improve the construction environment of the roof structure, and simplify the construction conditions of the roof structure, and can be used in cold areas, and has good integrity and good practicability.

Embodiment 2

This embodiment is the construction method of the durable roof structure with frost resistance and high ductility provided by embodiment 1, comprising:
- S10. Using 1:3 cement mortar for the roof board to be leveled and smoothed to form the base layer 1;
- S20. Cleaning the surface protrusions of the base layer 1, laying 1:3 multi-component solid waste cementitious material mortar on the upper part of the base layer 1 for leveling, and reserving a certain width of separation seams to form a leveling layer 2;
- S30. Cleaning the particles and floating dust on the surface of the leveling layer 2 to ensure the tightness of the joints; using a spray gun to shoot the leveling layer 2 horizontally or lifting the spray gun slightly upwards, so that the sprayed High-intensity Elastomeric Polyurea Waterproofing Coating is evenly dispersed in the air to form a flexible waterproof coating 3 on the surface of the leveling layer 2;
- S40. Cleaning the surface of the flexible waterproof coating 3 to ensure that the surface of the flexible waterproof coating 3 is dry and smooth, and has no bulging and cracking phenomenon; laying a certain thickness of graphite modified extruded polystyrene foam board to form a thermal insulation layer 4;
- S50. Cleaning the surface of the thermal insulation layer 4; fully covering the surface of the thermal insulation layer 4 with PVA (Polyvinyl Alcohol) Fiber-Engineered Cementitious Composites, taping and leveling to form a crack-resistant and frost-resistant surface layer 5.

In this embodiment, in step S20, the width of the separation seam is 5-20 mm, and the maximum distance between the separation seams is 6 m.

In this embodiment, in step S40, the thickness of the graphite modified extruded polystyrene foam board is 60 mm.

The above are only preferred embodiments of the invention, and do not limit the technical scope of the invention, therefore, any minor modifications, equivalent changes and modifications made to the above embodiments according to the technical essence of the invention are still belong to the scope of the technical solution of the invention.

The invention claimed is:
1. A durable roof structure with frost resistance and high ductility comprising:
   a base layer;
   a leveling layer, disposed on the base layer;
   a flexible waterproof coating, disposed on the leveling layer;
   a thermal insulation layer, disposed on the flexible waterproof coating; and
   a crack-resistant and frost-resistant surface layer, disposed on the thermal insulation layer; and
   wherein the leveling layer disposed between the base layer and the flexible waterproof coating is made of multi-component solid waste cementitious material comprising zirconium slag, coal gangue and carbide slag; and the thermal insulation layer disposed between the flexible waterproof coating and the crack-resistant and frost-resistant surface layer is made of graphite modified extruded polystyrene foam board.

2. The durable roof structure with frost resistance and high ductility as claimed in claim 1, wherein the thickness of the leveling layer is 15-30 mm.

3. The durable roof structure with frost resistance and high ductility as claimed in claim 1, wherein the flexible waterproof coating is sprayed with High-intensity Elastomeric Polyurea Waterproofing Coating.

4. The durable roof structure with frost resistance and high ductility as claimed in claim 1, wherein the thickness of the thermal insulation layer is not less than 25 mm.

5. The durable roof structure with frost resistance and high ductility as claimed in claim 1, wherein the crack-resistant and frost-resistant surface layer is made of Polyvinyl Alcohol Fiber-Engineered Cementitious Composites.

6. The durable roof structure with frost resistance and high ductility as claimed in claim 1, wherein a thickness of the flexible waterproof coating is not less than 1.5 mm; and a thickness of the crack-resistant and frost-resistant surface layer is not less than 30 mm.

\* \* \* \* \*